April 23, 1957 H. F. SADGEBURY 2,789,817

AUTOGRAPHIC REGISTER

Filed June 1, 1953 5 Sheets-Sheet 1

INVENTOR.
Herman F. Sadgebury.
BY
Wood, Herron & Evans.
ATTORNEYS.

AUTOGRAPHIC REGISTER

Filed June 1, 1953 5 Sheets-Sheet 2

INVENTOR.
Herman F. Sadgebury
BY
Wood, Herron & Evans
ATTORNEYS.

April 23, 1957 H. F. SADGEBURY 2,789,817

AUTOGRAPHIC REGISTER

Filed June 1, 1953 5 Sheets-Sheet 3

INVENTOR.
Herman F. Sadgebury
BY
Wood, Herron & Evans
ATTORNEYS.

AUTOGRAPHIC REGISTER

Filed June 1, 1953 5 Sheets-Sheet 4

INVENTOR.
Herman F. Sadgebury.
BY
Wood, Herron & Evans.
ATTORNEYS.

April 23, 1957 H. F. SADGEBURY 2,789,817

AUTOGRAPHIC REGISTER

Filed June 1, 1953 5 Sheets-Sheet 5

INVENTOR.
Herman F. Sadgebury
BY
Wood, Herron & Evans
ATTORNEYS.

United States Patent Office 2,789,817

Patented Apr. 23, 1957

2,789,817

AUTOGRAPHIC REGISTER

Herman F. Sadgebury, Dayton, Ohio, assignor to The Egry Register Company, Dayton, Ohio, a corporation of Ohio Application June 1, 1953, Serial No. 358,883

4 Claims. (Cl. 271—2.4)

This invention relates to autographic registers of the type designed to operate upon manifolding stationery provided in the form of a packet and consisting of a plurality of superimposed, continuous webs arranged in zig-zag folds. The folds are made at transverse lines of weakening which define sets of blank forms, such as sales slips, within the packet. Each of the forms within a set has a pair of spaced holes which are aligned transversely at the head end of the form adjacent the line of weakening. The pairs of holes in the respective sets of forms are all the same size and shape, and in the same positions in each form, so that registration of the respective holes in each set of forms insures registration of the forms comprising the set.

More specifically, the present invention is directed to improved feeding and aligning mechanism for an autographic register of the type described, which mechanism is arranged to cooperate with the holes in the forms to insure that the forms within a set are brought into and held in accurate registry upon the writing platen of the autographic register.

One of the features of the invention is that it permits the use of forms of different lengths. For example, forms varying in length as much as from several inches to approximately twelve inches may be used in one register without adjustments or other changes.

This feature is made possible by the provision of operationally interconnected feed means and aligning means in which the aligning means is readied or conditioned to engage the holes in the set of forms coming onto the writing platen substantially immediately after the issuing set of forms is engaged and started forward by the feed means. Provision is also made for the disengagement of the feed means shortly after the aligning means engages the oncoming set of forms. This takes place before the oncoming forms are in final position. Subsequent or final feed or advance of the oncoming forms is made by the aligning means alone, independent of the feed means to bring the forms into accurate registry at final position.

The feeding and aligning means of the invention are driven by a hand crank which is at the side of the register casing, one revolution of the hand crank completing a cycle of operation. Briefly, the operation in terms of one revolution of the crank is as follows: The aligning means, which holds the set of forms in place on the writing platen of the register while they are being filled in, is retracted into an inoperative position. The retracting movement of the aligning means engages the feed means. With the feed means engaged, the aligning means is automatically conditioned to receive and intercept the next succeeding set of forms. Once thus conditioned, it makes no difference whether the oncoming set of forms is short or long. The aligning means is conditioned to intercept the next set of forms before the crank has been turned through 40°. With a short form, one four inches in length for example, the major portion of the revolution of the crank is idle movement after the first 40° and up to a point approximately 20° removed from the completion of the cycle. Longer forms simply shorten the idle movement of the crank. Engagement of the aligning means with the holes in the oncoming set of forms results in automatic disengagement of the feed means. With the feed means disengaged, the aligning means becomes effective for final registry purposes within the last portion of the crank cycle. By conditioning or readying the aligning means in the very first portion of the crank cycle, and having it operate for positive alignment only in the last portion of crank rotation, substantially 300° of the cycle of the crank constitutes a period in which it is possible to intercept forms. The start and finish of this period, therefore, define the respective limits of lengths of forms which the register can accommodate.

In addition to the feeding and aligning mechanism, the present invention also concerns an improved automatically releasing stop mechanism which insures that the crank be turned through one revolution only, without overtravel. The stop mechanism thus cooperates with the feeding and aligning mechanism to insure accurate form registry.

Specific objects of the invention and other features and advantages will be apparent to those skilled in the art from the following detailed description of the drawings which disclose a preferred embodiment of the invention.

Figure 2:
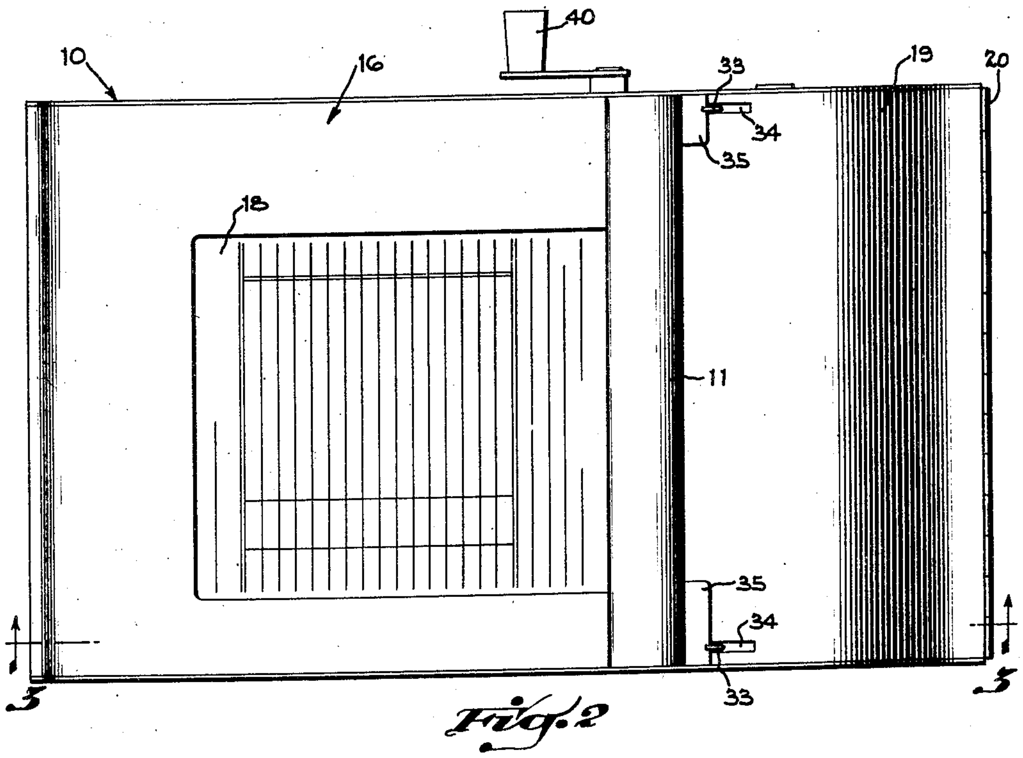
Figure 2 is a top plan view of the register shown in Figure 1.
Figures 3, 4:
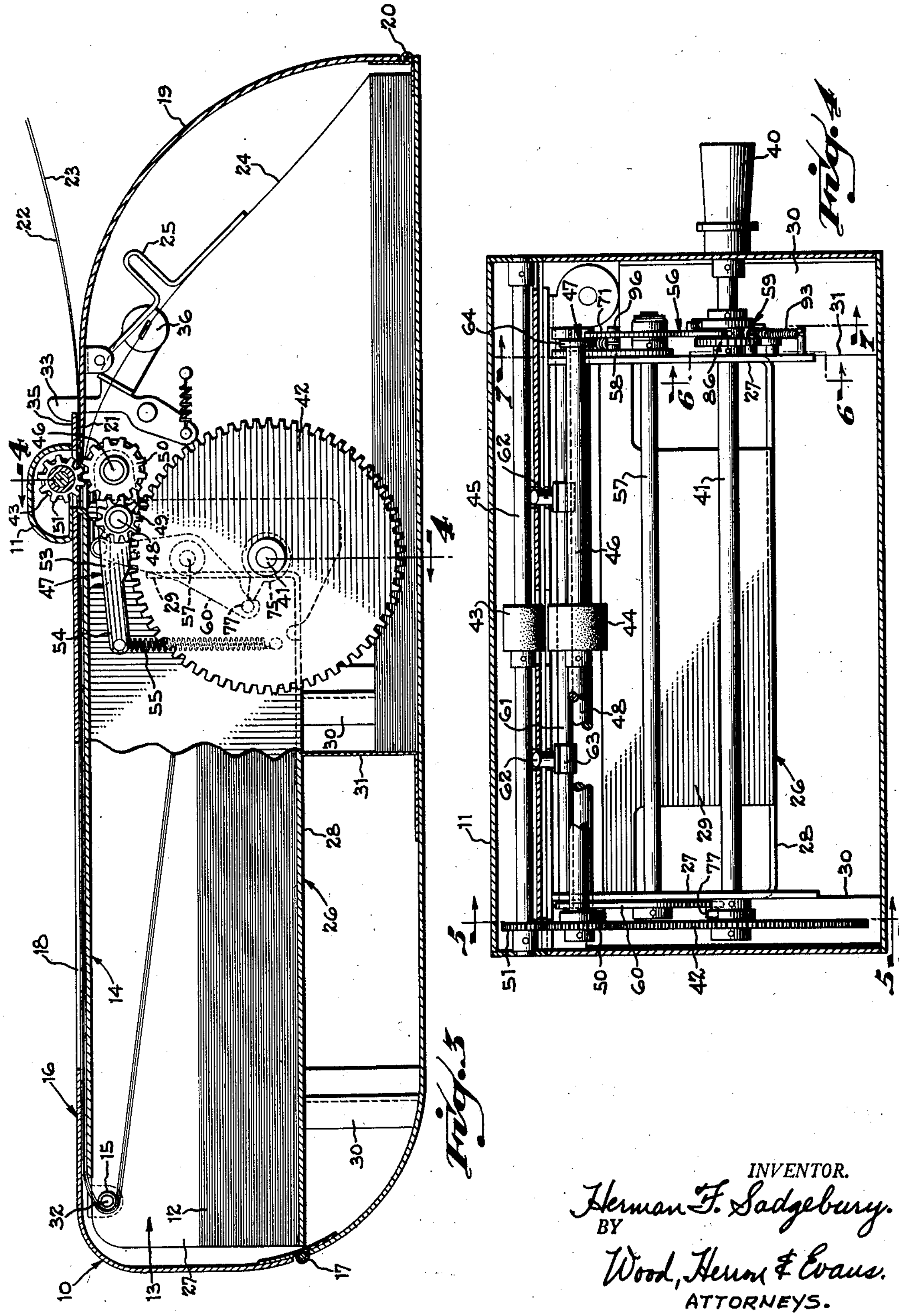
Figure 3 is a cross sectional view taken on the line 3—3 in Figure 2.
Figure 4 is a cross sectional view taken on the line 4—4 in Figure 3.
Figures 5, 6, 7, 8:
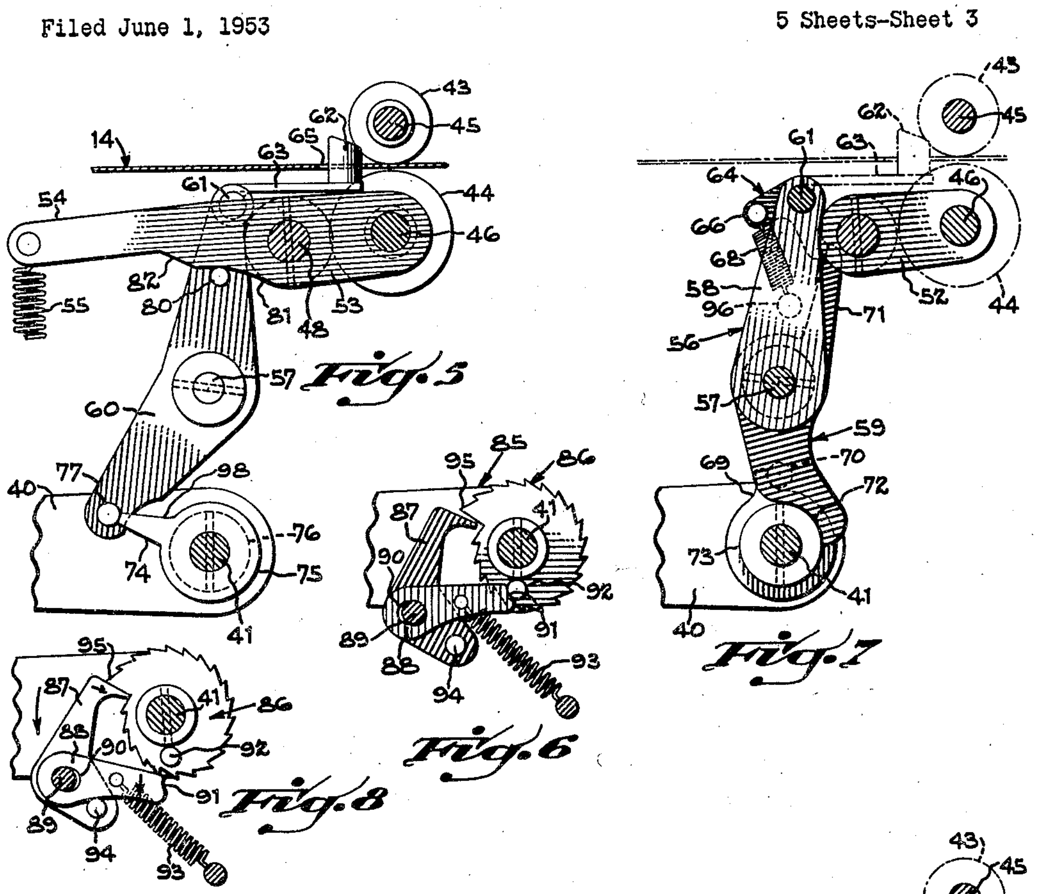
Figure 5 is a cross sectional view taken on the line 5—5 in Figure 4, in which that portion of the feeding and aligning mechanism at the right side of the autographic register, as viewed in Figure 2, is shown under conditions existing at the end of one cycle of operation.
Figure 6 is a fragmentary cross sectional view showing the automatically releasing stop mechanism under conditions existing at the end of a cycle.

Figure 7, which should be considered in conjunction with Figures 5 and 6, is a cross sectional view taken on the line 7—7 of Figure 4, showing that portion of the feeding and aligning mechanism which is at the left side of the register, as viewed in Figure 2, under conditions existing at the end of a cycle.

Figure 8 is a view similar to Figure 6 in which the stop mechanism is cleared and ready for the start of a cycle.

Figures 9, 10:
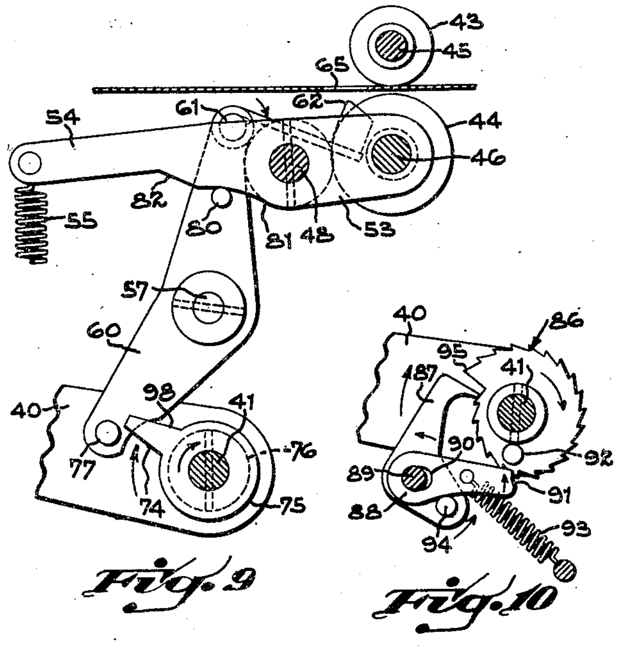
Figure 11:
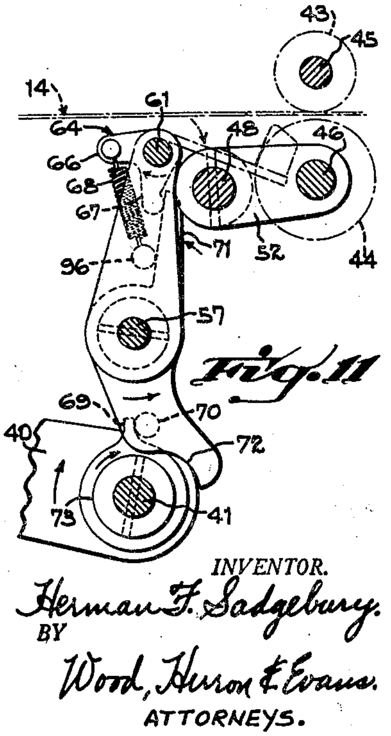

Figures 9, 10 and 11 correspond respectively to Figures 5, 6 and 7, and show the same elements under conditions at the start of a cycle.

Figure 12:
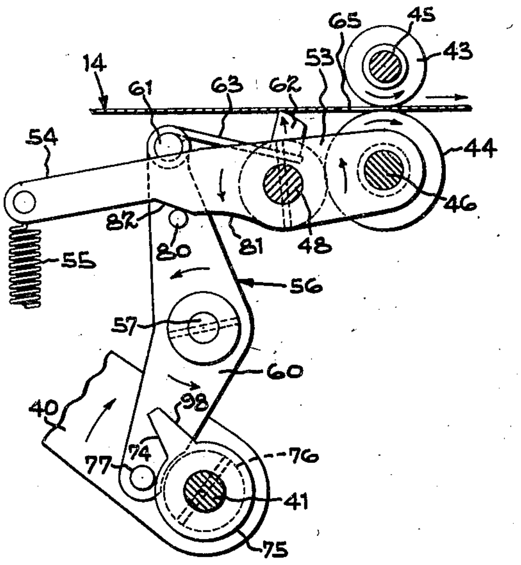
Figure 13:
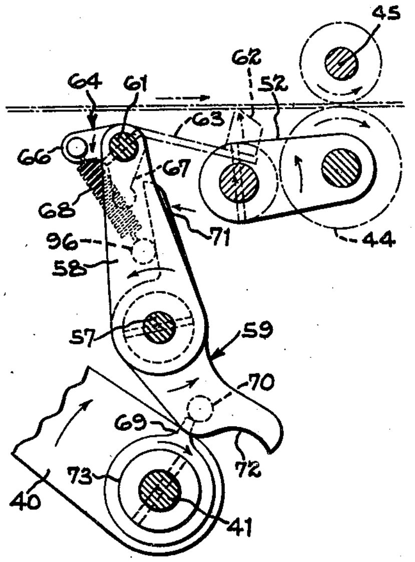

Figures 12 and 13 correspond respectively to Figures 5 and 7 and show the elements of the feeding and aligning mechanism at a subsequent stage in the cycle of operation.

Figure 14:
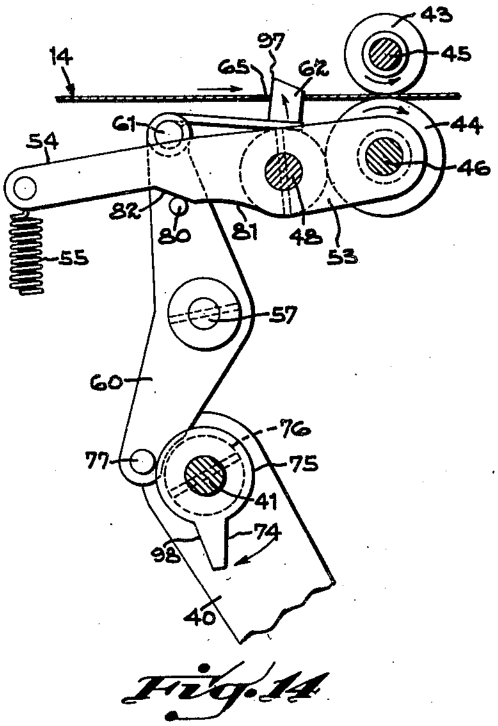
Figure 15:
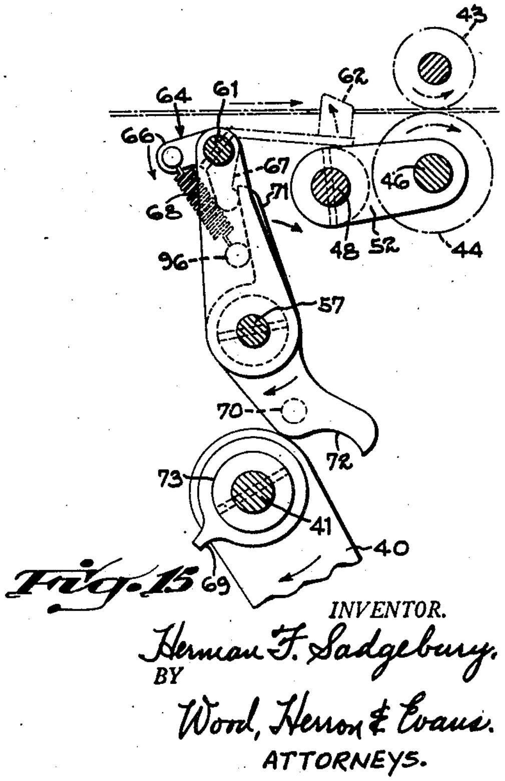

Figures 14 and 15 are similar respectively to Figures 12 and 13 and illustrate the conditions of the feeding and aligning mechanism at a later stage in the cycle of operation in which an oncoming set of forms is being intercepted by the aligning means.

Figures 16, 17, 18:
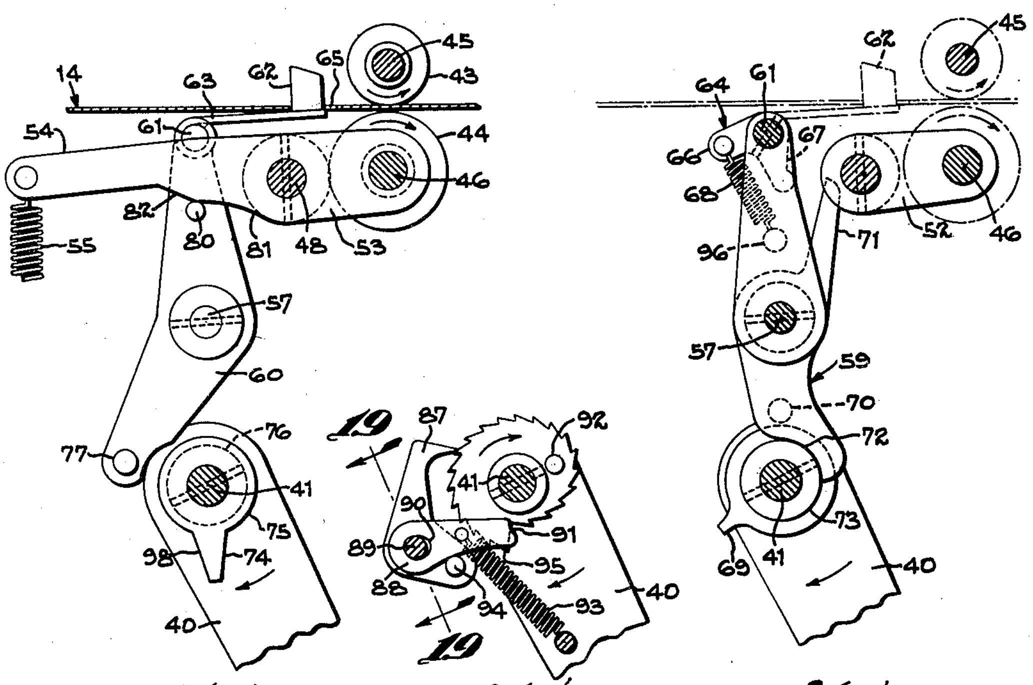

Figures 16, 17 and 18 are respectively similar to Figures 5, 6 and 7 and show the condition of the elements as the cycle nears completion.

Figure 19:
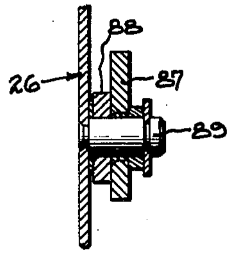

Figure 19 is a fragmentary cross sectional view taken on the line 19—19 in Figure 17.

Figure 20:
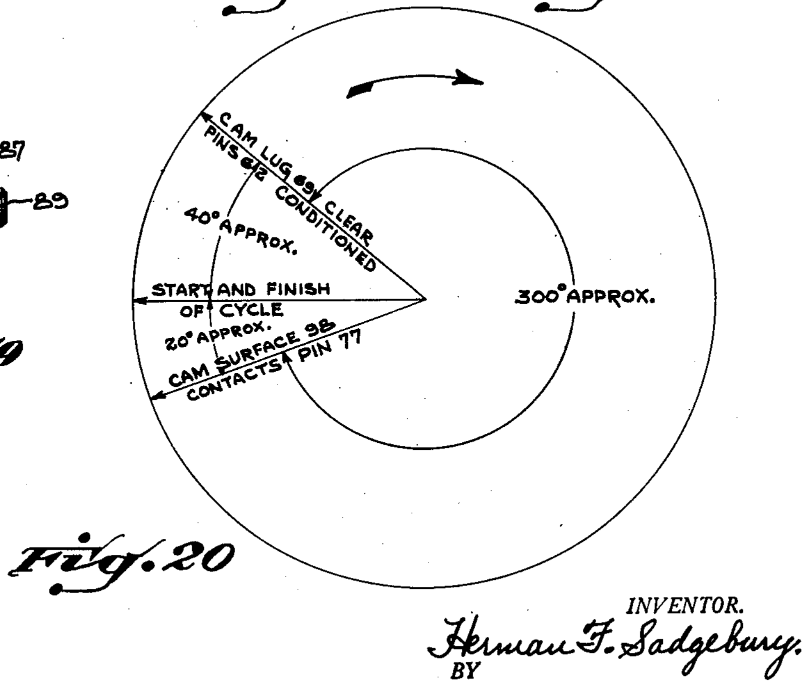

Figure 20 is a diagram in terms of one revolution of the hand crank.

Figure 1:
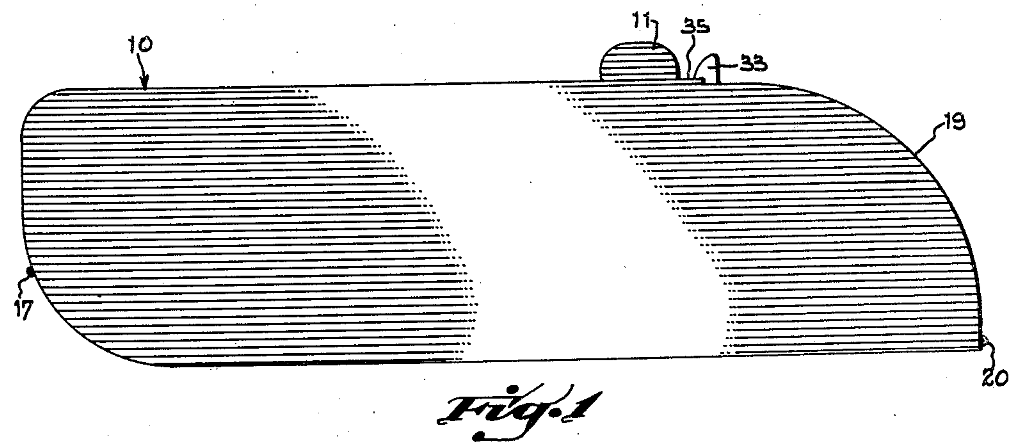
Figure 1 is a side elevational view of an autographic register incorporating the improved feeding and aligning mechanism of this invention.

The case of an autographic register incorporating the improvements of the present invention is indicated at 10. Generally, as viewed in Figures 1 and 2, the end of the register shown at the left constitutes the writing table onto which successive forms of manifolding stationery are fed. The lowermost one of the forms issues from the writing table into a record compartment which is at the right end of the machine. The other forms issue from the machine above the record compartment where they may be separated from the strip. The two parts of the machine are defined by the feed roller housing 11.

Referring now to Figure 3, a stock of forms, indicated at 12, is stored in a compartment 13 which is provided underneath a writing platen indicated at 14. The strip of forms is threaded around a guide roller 15 and then onto the writing platen. The top of the writing platen is enclosed by a lid assembly 16 which is hinged to the register casing as at 17. A rectangular opening 18 in the lid assembly provides access to the uppermost one of the forms on the writing platen. The feed roller housing 11 is fastened directly to the lid assembly and thus lifts with it when the lid assembly is opened. The record compartment at the right end of the register, as shown in Figure 3, is closed by means of a lid 19. This lid is hinged to the end of the register as at 20 and for the sake of appearance is curved over the record compartment. The upper end of lid 19 terminates under the feed roller housing 11. This end of lid 19 is tapered as at 21 to present a thin edge to the issuing forms to guide the lowermost one into the record compartment and the others toward issue outside of the machine. The forms themselves are shown diagrammatically only in the drawings by means of single lines. Only three forms are shown, an original 22 which issues with one copy 23, and a record copy 24 which issues into the record compartment. A conventional swinging arm 25 is provided on the underside of lid 19 to refold the record forms as they enter the compartment. It will be understood that multiple forms greater in number than the three shown here may be operated upon by the machine. These forms are available commercially and thus are not described in detail.

The improved feeding and aligning mechanism of this invention is mounted in a chassis indicated generally at 26, which is made as an integral part of compartment 13 which houses the stock of forms. Specifically, the housing includes a pair of side walls 27, a bottom wall 28 and a forward end wall 29. The two side walls 27 of the chassis extend forwardly of wall 29 to provide means for journalling the feeding and aligning mechanism. The chassis is supported in spaced relationship to the bottom of the casing by means of support channels indicated generally at 30, four such supports being provided, two at each side adjacent the respective ends of the register. The channels preferably are spot welded to the side walls 27 of the chassis and the respective side walls of the casing 10. The chassis partly overhangs the record compartment as will be seen from Figure 3. The rear of the record compartment is defined by a wall 31 which extends across the bottom of casing 10 underneath the chassis.

In readying the register for operation, the lid assembly 16 is swung up to expose the writing platen. The platen itself is also pivoted upon a shaft 32 which journals the guide roller 15. The writing platen may, therefore, be swung up to open the top of the storage compartment. A packet of blank forms folded in zig-zag fashion is placed in the compartment face down and the uppermost form started over the guide roller 15. The writing platen is then dropped into position and the strip of forms guided onto the writing table or platen 14. The lowermost one of the forms is threaded underneath the tapered edge 21 of the record compartment lid 19 and the other forms laid on top of this edge. The lid assembly 16 may then be dropped in place. Both lids are locked in closed position by a pair of spring urged hook members 33 which extend up through slots 34 in lid 19 to engage over extensions 35 at the opposite sides of the forward end of lid assembly 16. One of these hooks, as shown in Figure 3, may be latched by a key actuated lock 36 which is arranged, to prevent the hook from being disengaged. The one lock, therefore, prevents both lids from being opened, since the locked hook 33 holds down the lid assembly 16, and it in turn overlies the edge 21 of lid 19.

The feeding and aligning mechanism of the present invention is driven by means of a hand operated crank 40. This crank is pinned to an end of a main drive shaft 41 which is rotatably journalled in the forward extensions of the chassis and which extends through the left side wall of the register casing 10. The end of the drive shaft opposite crank 40 has a large gear pinned to it which is designated the main drive gear 42. In the following description of the aligning and feed mechanism, the respective sides of the register will be referred to as the "crank side," for crank 40, and the "gear side," for gear 42. As viewed by an operator of the machine when filling out a form, the crank side is at the left and the gear side at the right. One revolution of the crank constitutes a complete cycle of operation, that is, a set of forms is issued and a set brought onto the writing platen.

The main drive gear 42 drives a pair of upper and lower rubber feed rollers designated 43 and 44 respectively. The upper one of the rollers, namely 43, is pinned to a shaft 45 which is rotatably journalled within the respective end walls of the feed roller housing 11. The position of shaft 45 is, therefore, fixed with respect to the lid assembly 16 and consequently fixed with respect to forms upon the writing platen when the lid assembly is in locked position. The lower roller 44 is pinned to a shaft 46 which is disposed parallel with shaft 45 and rotatably journalled at its respective ends in a rocker arm assembly designated generally by the numeral 47. The rocker arm assembly 47 is designed to rock within limits about a cross shaft 48. This shaft is also journalled at its respective ends in the forward continuations of the side walls 27 of the chassis.

Referring to Figure 3, the ends of shaft 48, 46 and 45 at the gear side of the register carry gears. One of these, an idler pinnion 49, is rotatably journalled upon shaft 48 and is intermeshed with the main drive gear 42. The second gear, indicated at 50, is pinned to the shaft 46 which carries the lower feed roller 44. This gear is intermeshed with the pinion 49. The third gear, indicated at 51, is pinned to the shaft 45 which carries the upper feed roller 43. The latter gear is intermeshed with gear 50 so that the two rollers 43 and 44 turn simultaneously. The teeth on the respective gears 50 and 51 are sufficiently long that driving connection is maintainetd even though the feed rollers are spaced apart within the limits afforded by the movement of the rocker arm assembly 47. The rocking movement of arm assembly 47 is slight. At one limit the lower feed roller is up in strip engaging position and at the other limit it is down and clear of the strip. It will be noted that gear 51 is smaller than gear 50 and consequently upper roller 43 turns faster than lower roller 44, however, the diameters of the respective rollers vary in the same proportions and, therefore, the lineal feeding speeds at their strip contacting surfaces are equal.

Specifically, the rocker arm assembly 47, in addition to shafts 48 and 46, includes an arm 52 which is pinned to the end of shaft 48 at the crank side of the register and an arm 53 which is pinned to shaft 48 at the gear side of the register. The respective arms 52 and 53 rotatably journal shaft 46. At the gear side of the machine, arm 53 includes an extension beyond shaft 48 which is indicated by the numeral 54. The underside of this portion of arm 53 is configurated to provide two cam surfaces which will be described below. The outer end of extension 54 has the upper end of a coil spring 55 fastened to it. The lower end of coil spring 55 is pinned to the chassis so that the spring tends to rotate the rocker arm assembly in the counter-clockwise direction, as viewed in Figure 3, about shaft 48, thus urging the lower feed roller into strip engaging relationship with the upper feed roller. Disengagement of the two rollers, therefore, must be made by overcoming the force of spring 55. In general, disengagement of the feed rollers is brought about by movement of a second rocker arm assembly indicated generally by the numeral 56. The second rocker arm assembly constitutes the strip aligning means, to be described in detail below.

Rocker arm assembly 56 is mounted upon a cross shaft 57 which is rotatably journalled at its respective ends in the side wall extensions of the chassis directly above main drive shaft 41. At the crank side of the register an upright arm 58 is pinned to shaft 57. This arm is operationally associated with a pin carriage actuator indicated generally at 59 which is rotatably journalled on shaft 57 adjacent arm 58. At the opposite side of the machine, the gear side, shaft 57 has a bell crank shaped arm 60 pinned to it. The upper portion of arm 60 complements upright arm 58 at the crank side of the machine, and is in alignment with it.

The upper ends of these arms 58 and 60 mount a cross shaft 61 which is free to turn with respect to them. Shaft 61 is part of an assembly which will be designated the pin carriage, which also includes a pair of form aligning pins 62, a pair of pin carrying arms 63 and a cam element 64. The pins 62 are of conventional design and are arranged to engage the holes in the forms. Slots 65 in the writing platen accommodate the pins. Each aligning pin is mounted at the free end of one of the pin carrying arms 63. The opposite end of each arm 63 is wrapped around shaft 61 and pinned to it so that rotational movement of shaft 61 causes pins 62 to raise or lower. The cam element 64 is also pinned to cross shaft 61. It is located to the outside of the chassis adjacent upright arm 58. Cam element 64 is in the shape of a bell crank having arms 66 and 67, one of which extends from the side of shaft 61 opposite pins 62 and the other of which depends below shaft 61. A coil spring 68 is pinned at its upper end to arm 66 of cam element 64 and pinned at its lower end to upright arm 58. The effect of the coil spring is to urge cam member 64 in a counter-clockwise direction as viewed in Figure 7 about shaft 61 and, therefore, urge pins 62 toward an elevated position in which they are adapted to engage the holes in forms.

The pin carriage assembly is operated and controlled by the movement of the pin carriage actuator 59 which is in turn actuated by a cam lug 69 that is pinned directly to the main drive shaft 41 and thus keyed to crank 40. Lug 69 is arranged to engage a pin 70 which is on the side of the pin carriage actuator below shaft 57. The upper end of the pin carriage actuator comprises a finger 71, the upper end of which is engageable with the arm 67 of the cam element 64. As will be seen from Figure 7, rotational movement of the pin carriage actuator in a counter-clockwise direction about shaft 57 causes the finger 71 to contact arm 67 and thereby swing the pin carriage in a direction which will lower or disengage pins 62 from forms on the writing platen. This rotational movement is brought about by engagement of cam lug 69 with pin 70.

The pin carriage actuator 59, as will be seen in Figure 7, also serves as a means for limiting the upward movement of the pins 62 under the action of spring 68. In the position shown in Figure 7, a rounded surface 72 at the lower end of the pin carriage actuator is designed to engage a boss 73 which is part of the cam which has lug 69 formed on it. Boss 73 thus serves as a stop for the lower end of the pin carriage actuator so that finger 71 at the upper end thereof is fixed to prevent spring 68 from moving the pin carriage. This is the position of these elements at the start and the finish of a cycle of operation of the register.

The pin carriage actuator is only one of several elements in the register which has an effect upon the position of the pins 62. The pin carriage is locked in form engaging position at the start and finish of a cycle of operation by means of a pin carriage lock lug 74. See Figure 5. This lug is at the gear side of the machine and is formed as part of a cam element 75 which has a boss 76 upon it similar to the boss 73 at the crank side of the machine. Cam element 75 is pinned to the main drive shaft 41. Lug 74 is arranged to contact a pin 77 which is on the lower end of rocker arm 60 at the gear side of the register. Locked as shown in Figure 5, the pin carriage is at its forwardmost point of travel.

The pin carriage rocker arm assembly 56 is operationally interconnected with the lower feed roller rocker arm assembly 47 at a cam pin 80 which is secured to the side of the pin carriage rocker arm 60 above shaft 57. Pin 80 is in position to cooperate with two cam tracks formed in the lower edge of the extension 54. One of these cam tracks, indicated at 81, comprises a convexly curved surface which is positioned to be engaged by pin 80 at the start and finish of a cycle of operation to swing the lower feed roller downwardly out of strip engaging position. This movement is against the force of coil spring 55. The other cam track on the underside of the extension 54 is indicated at 82 and comprises a wedge surface designed to engage pin 80 under the action of spring 55. The engagement of wedge surface 82 with pin 80 constitutes a holding action to be discussed below. It should be noted at this time, however, that in order for pin 80 to engage the wedge surface 82, the two feed rollers must be in strip feeding relation with one another. See Figure 12.

The manner in which the parts described above cooperate in the operation of the register will be described below in detail under the heading "Operation."

The nature of the operation of the aligning and feeding mechanism demands that the crank 40 be stopped at an exact point, without overtravel, after each complete cycle. In the present instance, an automatically releasing stop mechanism, indicated generally at 85, is provided. This mechanism is disposed at the crank side of the machine just inwardly of the pin carriage actuator 59. Only three elements are required; a volute-shaped ratchet wheel 86, a pawl 87 and a stop arm 88. The volute-shaped ratchet wheel is pinned to the main crank shaft 41. The pawl and stop arm are both journalled on a stub shaft 89 which is fixed to the side of chassis 26. The journal for the stop arm 88 is a slot 90 which is only slightly longer than the diameter of stub shaft 89 to permit a limited amount of relative movement. The outer end of stop arm 88 is cupped at 91 for engagement with a stud 92 carried on the ratchet wheel. The stop arm is urged clockwise as seen in Figure 6 about the axis of stub shaft 89 by means of a coil spring 93 which has one end pinned to stop arm 88 and the other end pinned to the chassis 26 below drive shaft 41.

In the position of the elements shown in Figure 6, a cycle has been completed. At this time, the cupped end 91 of the stop arm 88, is in engagement with stud 92, which prevents further rotation of the crank 40 in the clockwise direction—which is its operating direction. Before the crank can be turned to start a new cycle, it must be rotating an amount in the counter-clockwise direction to free cupped end 91 from stud 92. This movement is slight and as soon as stop arm 88 is unseated, spring 93 snaps it down against a stop 94 which is carried on pawl 87. This relationship is shown in Figure 8. It is to be noted that once the cupped end 91 is free of the stud, spring 93 not only pulls the arm down against stop 94, but also causes the arm to shift at slot 90. The spring 93 also pulls the pawl in engagement with the ratchet wheel.

As the feed crank is turned, the volute-shaped ratchet wheel causes pawl 87 to rotate in a counter-clockwise direction about stub shaft 89. As the pawl is rotated, the stop arm 88 is lifted because of its engagement with stop 94. The spiral of the volute-shaped wheel is such that by the time the pawl is engaged with the last or highest tooth 95, the cupped end of stop arm 88 is in position to intercept stud 92. At the instant that contact is made by stud 92, stop arm 88 starts shifting relative to stub shaft 89 within the limits provided by slot 90. As soon as stub shaft 89 engages the opposite side of slot 90, a positive stop is provided. However, during the limited movement provided by slot 90, pawl 87 drips off the highest tooth 95 of the ratchet wheel, thus moving stud 92 away from stop arm 88, and conditioning the latch mechanism for release by the slight counter-clockwise movement described above.

*Operation*

Figures 5, 6 and 7 show respectively the feeding and aligning mechanism at the gear side of the machine, the crank latch mechanism, and the feeding and aligning mechanism at the crank side of the machine. The pins 62 are engaged in the holes in a set of forms on the writing platen, the pins being held in their forward position by the pin carriage locking lug 74. At this time, cam pin 80 is engaged with the concavely curved cam track 81 on the bottom of extension 54 so that the lower feed roller is disengaged. The finger 71 on the pin carriage actuator is also in engagement with arm 67 of cam element 64.

To start the cycle, the crank is first moved slightly in counter-clockwise direction as seen in Figure 6 to release stop arm 88. The crank is then free to be turned in the clockwise direction. Referring now to the diagram of Figure 20, two things happen in the first few degrees of crank rotation. For one, the pin carriage locking lug 74 moves clear of the pin 77 on the pin carriage rocker arm 60 at the gear side of the register. At the same time pin carriage actuator lug 69 at the crank side of the register engages the pin 70 and starts to swing pin carriage actuator 59 in the counter-clockwise direction. This movement causes the finger 71 on the pin carriage actuator to swing cam element 64 in the clockwise direction about cross shaft 61 thus lowering pins 62 to a point below the forms on the writing platen.

Continued counter-clockwise movement of the pin carriage actuator causes finger 71 to engage a stud 96 on the upright arm 58 of the pin carriage rocker arm assembly. From the point that engagement is made, further crank movement causes the lowered pin carriage assembly to swing in the counter-clockwise direction, thus retracting the pins to a point removed from the feed rollers in the direction of oncoming forms. The condition of the mechanism at the point contact is made by finger 71 and stud 96 is shown in Figures 9 and 11. Further rotation of the pin carriage rocker arm assembly from this point causes the pins 62 to engage the underside of the forms on the writing platen. This may be seen from a comparison of Figures 11 and 13. From the time pins 62 engage the underside of the forms, the arm 67 of cam element 64 moves away from finger 71. Under these conditions, spring 68 is under tension and will cause the pins 62 to snap into engagement with the holes of the next succeeding set of forms as soon as the set is advanced to bring the holes into alignment above them. In going from the conditions shown in Figure 9 to those of Figure 12, it will be obvious that pin 80 leaves cam track 81 and moves onto wedge 82. Although the pin carriage lock lug 74 is free of pin 77 under the conditions shown in Figure 9, the lower feed roller 44 is held out of engagement with the forms by cam pin 80. As soon as the pin carriage actuator finger 71, through its engagement with stud 96, swings the pin carriage rocker arm assembly far enough in the counter-clockwise direction to move pin 80 off of the cam surface 81, spring 55 can then swing the lower feed roller rocker arm assembly to bring the lower feed roller into contact with the underside of the forms. Of course, from the beginning of the rotation of the crank 40, the upper and lower rollers have been rotating, being driven through the gear chain shown in Figure 3.

Referring again to the diagram of Figure 20, all of the above takes place in the first 35 degrees approximately of crank rotation. From this point the forms start to feed. As soon as the crank is turned sufficiently far to free pin actuator lug 69 from pin 70, the elements of the feed and aligning mechanism are conditioned to receive the next succeeding set of forms. In the embodiment shown, this occurs at the end of approximately 40 degrees of crank rotation and establishes the lower limit of the length of forms which may be used in the autographic register. As a practical consideration, it is doubted if there are any forms being used in commerce which are shorter than the limit set by the point at which the pin carriage actuator lug 69 clears pin 70.

During the subsequent feeding of the forms, the pins 62 ride on the undersurface of the lowermost form of the issuing set. The instant, however, that the holes in the oncoming set of forms are presented above the pins, the pins snap into place under the action of the coil spring 68. The holes in the forms should be substantially larger than the diameter of the pins and the pins shaped to present a blunt point 97 to the oncoming forms. It should be noted, as shown in Figures 14 and 15, that the movement of the pins into the form holes has no effect upon the other parts of the feeding and aligning mechanism. However, continued strip movement pulls the pins toward the feed rollers. This movement swings the pin carriage rocker arm assembly in the clockwise direction about shaft 57 which causes cam pin 80 to ride along the wedge surface 82 to the point shown in Figure 16 thus swinging the lower feed roller rocker arm assembly against the force of spring 55 to disengage the lower feed roller 44. Thus, the feed rollers, in a sense, disengage themselves; because the feed rollers in advancing the strips after the pins 62 engage in the holes pull cam pin 80 into roller disengaging position. Nothing more happens in the cycle until the crank is near the stopping point, when a cam surface 98 on the leading edge of the pin carriage locking lug 74 engages the pin 77 on the lower end of the rocker arm 60 at the gear side of the register. Referring to the diagram of Figure 20 again, contact between cam surface 98 and pin 77 is made approximately 20 degrees in the rotation of the crank away from the stopping point. This establishes the maximum length of form which may be used in the register. With cam surface 98 in contact with pin 77, the pin carriage rocker arm assembly is rotated clockwise, thereby moving the pins 62 toward the feed rollers. During the latter movement of the pins 62, they, and not the feed rollers, advance the forms. In doing this, the pins serve to finally align and bring the superimposed forms within the set on the platen into accurate registry.

In the very last portion of crank movement, the pin carriage lock lug 74 is brought into engagement with pin 77 to lock the pins 62 in fixed relation relative to the writing platen, thereby holding the forms in accurate registry while they are being filled in. The crank latch mechanism 85 is related to the pin carriage lock lug 74 such that stud 92 engages the cupped end 91 of the stop pin 88 when lug 74 is in pin carriage locking position. The condition of the various parts of the feeding and aligning and crank lock mechanism is shown in Figures 5, 6 and 7.

Generally speaking, the pin carriage comprises the form aligning means. The lower feed roller rocker arm assembly comprises the feed means. The two are operationally interconnected by the cam pin 80 and cam tracks 81 and 82. In the same sense, the pin carriage actuator 59 is also interconnected with the feeding means in that it causes the cam pin 80 to move into a position which permits the feed means to engage. Thus in general terms, the operation is one in which the pin carriage actuator retracts the aligning means and engages the feed means. Once the feed means are engaged, aligning mechanism is conditioned to engage the oncoming succeeding set of forms. As soon as the aligning means engages the next set of forms, continued operation of the feed means moves the aligning means into a position in which it disengages the feed means. Once disengaged, additional positive movement of the aligning means bring the forms into accurate registration.

Having described my invention, I claim:

1. In an autographic register adapted to operate upon manifolding stationery consisting of a continuous strip of superimposed forms having aligning holes therein, feed and aligning means comprising a first rocker arm assembly, a feed roller carried by said first rocker arm assembly, said first rocker arm assembly movable between a first position in which said feed roller is engaged with the strip for feeding the same and a second position in which said feed roller is disengaged, a second rocker arm assembly, said second rocker arm assembly carrying aligning pins and being movable from a final position in which said pins are engaged in said aligning holes in strip aligning position to a first position in which said pins are disengaged from said holes and thence to an aligning hole intercepting position in which said pins ride against the underside of forms being fed by said feed roller, means urging said pins upwardly when they are in said intercepting position, whereby said pins automatically engage the holes in the oncoming forms when said holes are directly above said pins, and means interconnecting the respective rocker arm assemblies, said means being effective to move the first rocker arm assembly into its strip disengaging position after the aligning pins on the second rocker arm assembly engage said holes, and means independent of the feed means for returning said second rocker arm assembly to said final position, whereby the final advance of the strip of forms is made by the pins alone.

2. In an autographic register adapted to operate upon manifolding stationery consisting of a continuous strip of superimposed forms having aligning holes therein, feed and aligning means comprising a first rocker arm assembly, a feed roller carried by said first rocker arm assembly, said first rocker arm assembly movable between a raised position in which said feed roller is engaged with the strip for feeding the same and a lowered position in which said feed roller is disengaged, a second rocker arm assembly, said second rocker arm assembly carrying aligning pins and being movable from a final, raised, forward position in which said pins are engaged in said aligning holes in strip aligning position to a retracted and lowered position in which said pins ride against the underside of the forms being fed by said feed roller, means urging said pins upwardly when they are in the latter position, whereby said pins automatically raise to engage the holes in the oncoming forms when said holes are over said pins, and means interconnecting the respective rocker arm assemblies effective to lower the first rocker arm assembly into its strip disengaging position after the aligning pins are engaged in said holes, and means independent of the feed means effective to move said second rocker arm assembly forward into strip aligning position, whereby the final advance of the strip of forms is made by the pins alone.

3. In an autographic register adapted to operate upon manifolding stationery consisting of a continuous strip of superimposed forms having aligning holes therein, feed and aligning means comprising a first rocker arm assembly carrying a feed roller, said rocker arm assembly movable between a first position in which said feed roller is engaged with the strip for feeding the same and a second position in which said feed roller is disengaged from said strip, a second rocker arm assembly, said second rocker arm assembly carrying aligning pins and being movable from a final position in which said pins are engaged in said aligning holes in strip aligning position to an aligning hole intercepting position in which the aligning pins ride against the underside of the forms being fed by said feed roller, means urging said pins upwardly when they are in the latter position, whereby holes in the oncoming strip of forms are intercepted by said pins, said second rocker arm assembly being free to be pulled toward said final position by the moving strip, and means carried by said second rocker arm assembly engageable with the first mentioned rocker arm assembly to move said feed roller into its disengaged position during the movement of the second rocker arm assembly toward final position, and means independent of the feed means effective to move said second rocker arm assembly into final strip aligning position, whereby the final advance of the strip of forms is made by the pins alone.

4. In an autographic register adapted to operate upon manifolding stationery consisting of a continuous strip of superimposed forms having aligning holes therein, feed and aligning means comprising an aligning assembly, means pivotally mounting a pair of aligning pins on said aligning assembly for swinging movement between a raised position in which the pins are engageable with the aligning holes in the forms and a lowered position in which said pins are below said forms, a feeding rocker arm assembly carrying a feed roller and being movable between a position in which said feed roller is in strip engaging position for feeding the same and a position in which said feed roller is disengaged from said strip, means to move said aligning assembly from a forward position in which the pins carried thereby are in a raised, final strip aligning position to a retracted position in which said pins are below the strip and removed from said final strip aligning position, spring means adapted to urge said pins upwardly when the aligning assembly is in said retracted position, whereby said pins ride against the underside of forms being advanced by said feed means in positions to intercept said aligning holes and engage therein, whereby the engaged pins pull the aligning assembly toward the final aligning position, and means carried by said aligning assembly effective to disengage the said feed roller from the strip after the aligning pins have been engaged in the holes as aforesaid but before said pins are in final strip aligning position, and means independent of the feed means for moving said aligning assembly to pull the strip of forms into final aligning position.

References Cited in the file of this patent

UNITED STATES PATENTS

| | | |
|---|---|---|
| 1,837,587 | Rohner | Dec. 22, 1931 |
| 1,880,111 | Shmyroff et al. | Sept. 27, 1932 |
| 2,088,054 | Crosman | July 27, 1937 |
| 2,106,520 | Cooke | Jan. 25, 1938 |
| 2,110,828 | Diesbach | Mar. 8, 1938 |
| 2,172,637 | Fader | Sept. 12, 1939 |
| 2,264,469 | Borchers | Dec. 2, 1941 |
| 2,577,199 | Klopner | Dec. 4, 1951 |
| 2,626,146 | Goetz et al. | Jan. 20, 1953 |